United States Patent [19]
Carmichael et al.

[11] 3,851,208
[45] Nov. 26, 1974

[54] LIGHTING SYSTEM

[75] Inventors: Thomas F. Carmichael, Drayton Plains; Richard J. Maier, Pontiac, both of Mich.

[73] Assignee: Syncro Corporation, Oxford, Mich.

[22] Filed: Aug. 9, 1973

[21] Appl. No.: 387,137

Related U.S. Application Data

[63] Continuation of Ser. No. 157,328, June 28, 1971, abandoned.

[52] U.S. Cl. ................... 315/79, 240/7.6, 322/78, 323/76
[51] Int. Cl. .............................................. B60q 1/26
[58] Field of Search .......... 240/7.6, 8.1; 315/77, 78, 315/79, 82; 322/78, 79, 91, 95, 96; 323/76, 79

[56] References Cited
UNITED STATES PATENTS
3,089,997  5/1963  Kimbleton ......................... 322/95
3,601,685  8/1971  Kuhn ............................... 322/91 X

*Primary Examiner*—Herman Karl Saalbach
*Assistant Examiner*—Lawrence J. Dahl
*Attorney, Agent, or Firm*—Harness, Dickey & Pierce

[57] ABSTRACT

An electrical system for regulating the output potential to a lighting circuit for a vehicle from an existing electrical generating device driven by the engine of the vehicle whereby the potential to the lights will be sufficient to provide adequate lighting over the usable speed range of the engine by boosting the potential at the low speed end and by regulating the potential at the high speed end to prevent excessive voltage to the lights.

15 Claims, 8 Drawing Figures

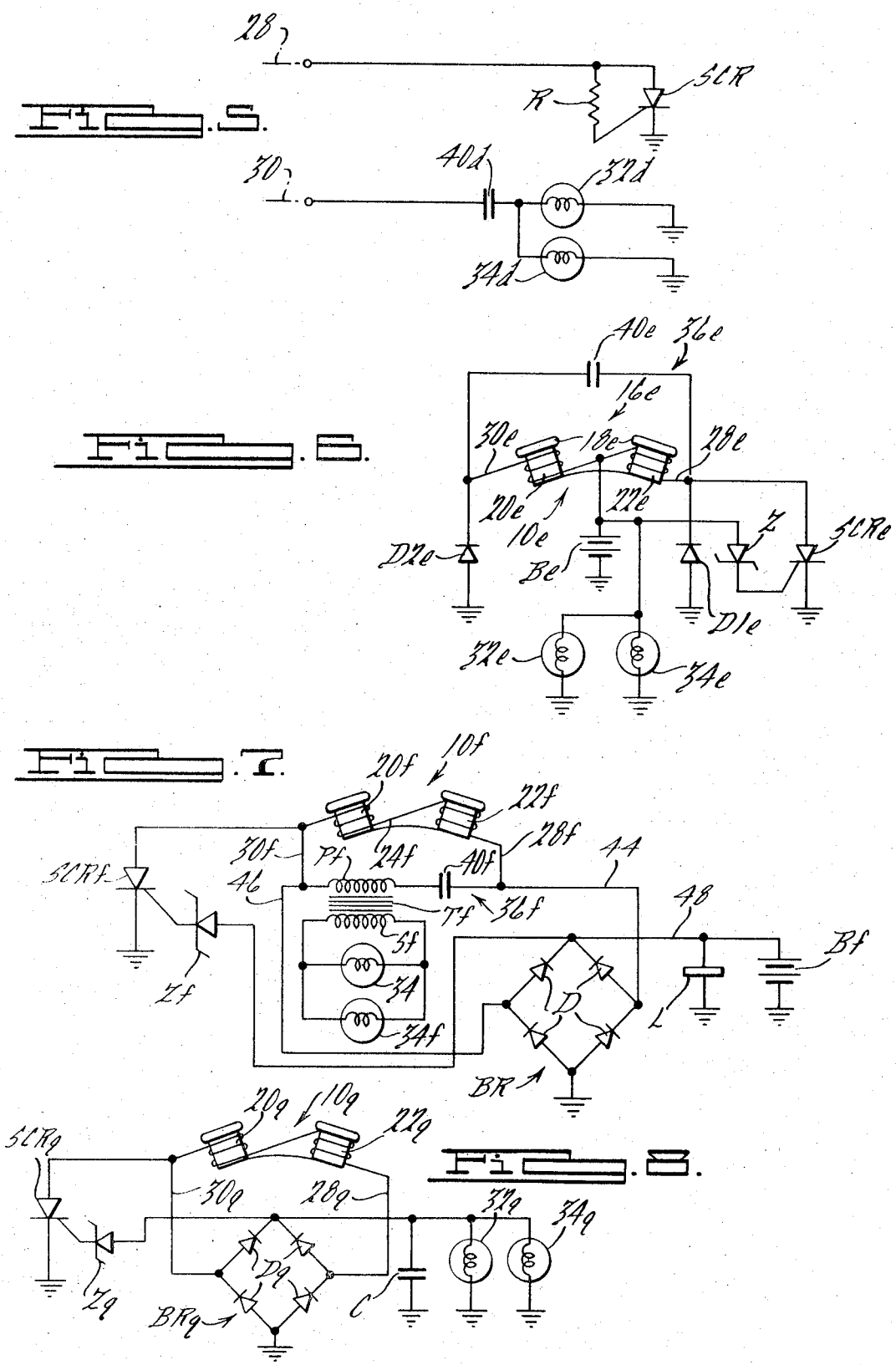

LIGHTING SYSTEM

This is a continuation, of application Ser. No. 157,328, filed June 28, 1971, now abandoned.

SUMMARY - BACKGROUND OF THE INVENTION

The present invention relates to an electrical system for regulating the potential to a vehicle lighting circuit.

Vehicles such as snowmobiles have their lights energized by a generating device such as a magneto which also provides electrical energy for the ignition system of the vehicle engine. The output of the generating device, however, varies with engine speed and where there is no battery in the system, at low engine speeds, such as idle, the lights may dim considerably. This can be especially troublesome if the vehicle is being driven and while it is moving at a fair rate of speed the operator permits the vehicle to coast by releasing the accelerator pedal. In this condition the vehicle may still be moving rapidly but the vehicle operator's visibility will be substantially reduced since the lights will dim. Another problem occurs in multiple lighting systems if one light burns out. With some generating devices this reduction in load will result in a substantial increase in potential at high speeds to a magnitude sufficient to overload and burn out the remaining light or lights. In the present invention a simple circuit system is provided which can be readily connected to the existing leads from the generating device and which regulates the output potential such that the potential at the low speed end is boosted to substantially inprove the lighting at low engine speeds and the potential is regulated such that at high engine speeds the potential applied to a remaining light or lights will not be excessive to burn out such light or lights in the event one light does burn out.

Therefore, it is an object of the present invention to provide an electrical system for use with the lighting windings of a generating device whereby the potential to the lights will be regulated.

It is another object to provide an electrical system for use with the lighting winding of a generating device for boosting the potential at low speeds such as idle to improve the lighting at such low speeds.

It is another object to provide an electrical system for use with the lighting winding of a generating device whereby the potential at high speeds will be regulated to prevent burn out of the remaining light or lights in the event one light burns out.

The present invention utilizes a specially tuned resonant circuit to provide the improved lighting function. Therefore it is another object to provide a resonant system in combination with the lighting windings of a generating device for regulating the potential of the lighting; it is another object to use such resonant system for the low speed and to use a regulating circuit for the high speed end.

The system of the present invention is also useful where a battery is in the system and is used to regulate the charging potential to the battery such as to provide sufficient potential at low engine speeds and also provides regulation to the lights in the event the battery is removed from the circuit and the vehicle is operated solely via the potential from the generating device; in this event the system of the present invention will provide a regulated potential to the lights boosting the low speed end and preventing burn out at the high speed end.

Therefore it is another object of the present invention to provide an electrical system for use with a lighting circuit including a battery and battery charge circuit whereby a regulated potential is provided for charging the battery and, in the event the battery is removed, a regulated potential is provided for lighting the lights.

Other objects, features, and advantages of the present invention will become apparent from the subsequent description and the appended claims, taken in conjunction with the accompanying drawings in which:

FIG. 5 is a modified system including separate regulator and resonant circuits;

FIG. 6 is another system with separate regulator and resonant circuits; and

FIG. 7 is a system including a full bridge and has separate regulator and resonant circuits; and FIG. 8 is a regulated system for a lighting circuit.

Figure 1:
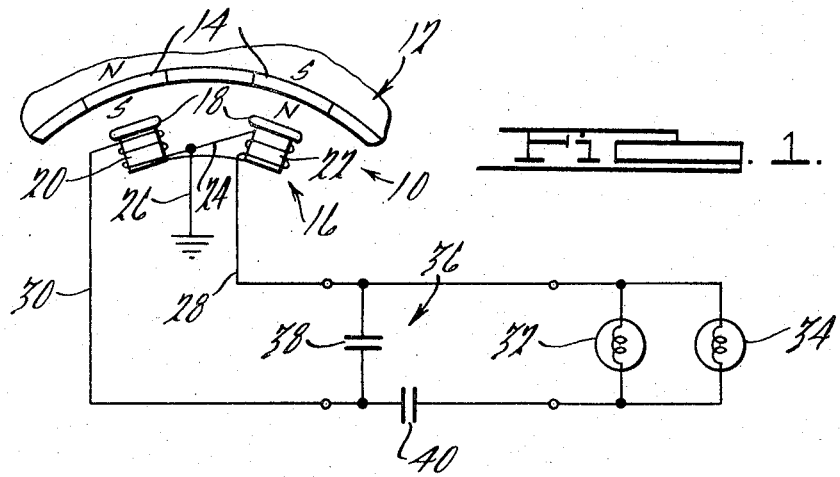
FIG. 1 is a schematic diagram of the lighting winding of an electrical generating device and an associated lighting circuit and an electrical circuit embodying features of the present invention.

Looking now to FIG. 1 a permanent magnet electrical generating device is partially shown and is indicated by the numeral 10. The operating device 10 has a rotor 12 adapted to be driven by the engine of a vehicle such as a snowmobile, and includes a plurality of circumferentially spaced permanent magnets 14 of alternating polarity. The magnets are preferably made of a ceramic material such as barium ferrite. A stator 16 includes a plurality of radially extending, circumferentially spaced poles 18. On two of the poles are wound lighting windings 20 and 22 which are electrically connected in series aiding relationship via a conductor 24 which is grounded via ground 26 whereby the windings 20 and 22 define a grounded center tapped winding. Output conductors 28 and 30 are connected to opposite sides of windings 20 and 22. A pair of lights 32 and 34 are connected in parallel, In a conventional circuit one side of the lights 32, 34 is connected to ground and the other side is connected to one of the conductors 28 or 30 whereby the lights 32, 34 are connected across only one of the windings 20, 22 to ground. With such a lighting circuit, however, the lights 32, 34 will be dimly lit at low speeds such as idle and at high speeds, if one of the lights 32, 34 is burned out, the other of the lights may be burned out because of the excessive voltage generated. These problems are corrected by the circuit of FIG. 1. In FIG. 1, the lights 32, 34 are ungrounded and are connected in parallel to a resonant circuit 36 which is connected to conductors 28 and 30.

The resonant circuit 36 includes a capacitor 38 connected between conductors 28 and 30 and hence across the windings 20, 22; another capacitor 40 is connected between conductor 30 and one side of lights 32, 34. Note that in some existing generating device constructions the center tap lead is difficult to get at and only the leads such as leads 28 and 30 are readily accessible; therefore the circuit of FIG. 1 provides a simple circuit connection for such generating devices.

An engine driving the rotor 12 will vary in speeds, over the speed range, from around 1,000 r.p.m. (at idle) to around 10,000 r.p.m. (at wide open throttle). The voltage output from the generator 10 will vary generally as a straight line with speed. In conventional systems, while adequate voltage is generated at normal engine running speeds (i.e. 5,000 r.p.m.) to properly energize the lights, the voltage at slower speeds, such as, at or near idle speeds, will be too low to adequately energize the lights and will be unnecessarily high at maximum speeds resulting in premature light burn out. In this regard it should be noted that the variations in voltage have a substantial effect on light output since for an incandescent lamp the light output in lumens varies generally as the square of the applied voltage.

The capacitor 40 is selected to boost the low speed voltage output while the capacitor 38 tends to regulate or lower the high speed voltage output. The capacitor 40 can be considered to be in series resonance with the windings 20 and 22 and in series with the parallely connected lights 32, 34; the capacitance 38 can also be considered to be in series resonance with the windings 20 and 22 while it is in parallel with lights 32, 34. For an engine having a speed range of from around 1,000 r.p.m. to around 10,000 r.p.m., the capacitor 40 is selected to have a magnitude where its capacitive reactance equals the inductive reactance of windings 20 and 22 at an engine speed of around 2,000 r.p.m. This point of resonance is selected taking into consideration the resistive impedance of the series circuit as provided mainly by the resistance of the lights 32, 34. The resistance of the circuit will lower the Q of the series resonant circuit and will also result in a generally flat response over a substantially wide speed range. By selecting the point of resonance, considering the Q of the circuit as affected by the resistive impedance, to be proximate to the idle speed of the engine, the voltage output at idle will be substantially raised to a magnitude providing adequate light energization.

The effect, however, of the series resonance as provided by capacitor 40 will be quite minimal at higher engine speeds i.e. 5,000 r.p.m. and above. The magnitude of the capacitor 38 is selected to be in resonance with the windings 20 and 22 at around 5,000 r.p.m.; this resonant circuit, however, while boosting the voltage of resonance will, at higher engine speeds result in an increase in circulating current flowing from windings 20 and 22 to capacitor 38 which in turn will result in an increase in the back m.m.f.; this will provide a regulating effect by reducing the voltage generated by windings 20 and 22. Note that capacitor 38 has a magnitude whereby it has little effect over the low speed range but is effective at higher speeds. In one preferred form the magnitude of capacitor 40 was approximately 120 times the magnitude of capacitor 38. In this same form of circuit where not capacitors 38 and 40 were used the output voltage for one generator was 6.9 volts at 1,200 r.p.m. and 15.5 volts at 7,750 r.p.m. When the capacitors 38 and 40 were used the output voltage for the same generator was 11.9 volts at 1,200 r.p.m. and 11.6 volts at 7,750 r.p.m.

The embodiments of FIGS. 2 – 5 are modifications of the circuit of FIG. 1 for use with the generator 10. In these embodiments only the structure different from that of FIG. 1 has been shown and similar components serving similar functions are given the same numerical designation with the addition of a letter postscript.

Figure 2:
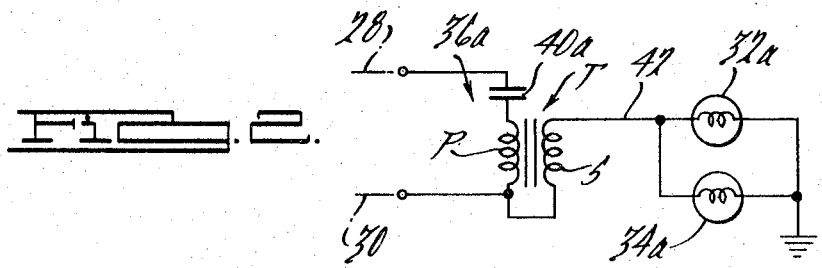
FIG. 2 is a schematic diagram of a modified form of electrical circuit.

The embodiment of FIG. 2 shows a modified form of lighting circuit in which the lights 32a and 34a are connected in parallel and have one end grounded. The lights are normally grounded at one end in existing installations and with the circuit of FIG. 1 the lights 32 and 34 are ungrounded. In FIG. 2 capacitor 40a is a part of a series resonant circuit 36a and is connected in series with windings 20 and 22 of generator 10 via conductors 28 and 30. The capacitor 40a is connected in series with the primary P of a transformer with the series circuit of capacitor 40a and primary P being connected in series with windings 20 and 22. A secondary winding S of transformer T is connected to the ungrounded side of lights 32a and 34a via conductor 42. The magnitude of capacitor 40a is selected to be in resonance with the inductance of transformer T, via primary P, and windings 20 and 22 whereby the voltage output to lights 32a and 34a is boosted at the low end to substantially improve the lighting at low engine speeds such as engine idle.

Figure 3:
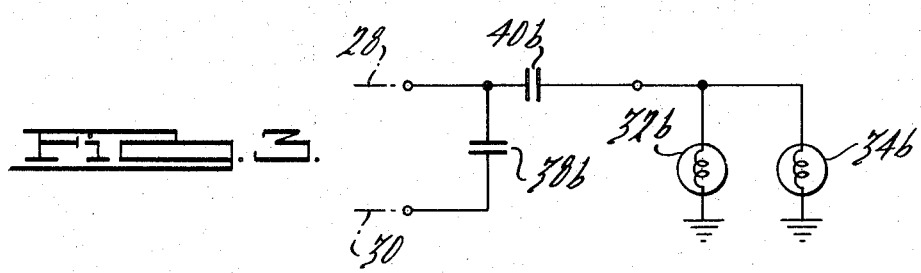
FIG. 3 is a different form of electrical circuit including features of the present invention.

The system of FIG. 3 is similar to that of FIG. 1 except that the lights 32b and 34b are maintained with one end at ground. The capacitor 38b provides a parallel resonant circuit with both windings 20 and 22 while capacitor 40b provides a series resonant circuit only with winding 22 (since the lights 32b and 34b in the series resonant circuit are connected to ground at one end.) As with the embodiment of FIG. 1 the series and parallel resonant circuits act to increase the voltage at the low speed end (idle) and regulate or reduce the voltage at the high speed end.

Figure 4:
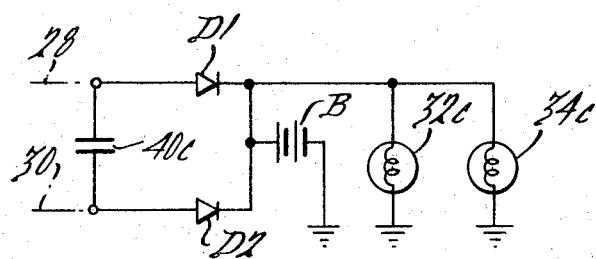
FIG. 4 is a modified form of system for use with a battery charging circuit and lighting circuit.

FIG. 4 shows another circuit in which the lights can be maintained grounded. Thus lights 32c and 34c are connected in parallel and have one side grounded. The opposite side of lights 32c and 34c is connected to the positive side of a battery B which has its opposite side grounded. Battery B is charged by d-c current from the alternator 10 via diodes D1 and D2 which are connected to conductors 28 and 30, respectively. Note that the lights 32c and 34c are energized by battery B as well as generator 10. The battery B acts as a stabilizing or regulating element relative to the generator 10 and in this regard acts to protect lights 32c and 34c from burn out by preventing the generated output voltage from becoming excessively high at high engine speeds. However, in the event the battery is removed for replacement and the engine is still used then the lights 32c and 34c could not be protected. Capacitor 38c is connected across conductors 28 and 30 and hence is connected in parallel with the windings 20 and 22. The capacitor 40c is selected with parameters similar to capacitors 40 and 40b and is in resonance with windings 20 and 22 at lower engine speeds. This will act to boost the voltage applied to battery B for charging at lower engine speeds and since capacitor 40c does parallel the windings 20 and 22 it will, at higher engine speeds, act as a shunt; the shunt current will tend to shut down the alternator 10 and hence limit the voltage to the lights 32c and 34c at higher engine speeds; in this way, in the event the engine is used with the battery B out of the circuit, the circuit of capacitor 38c will prevent the voltage to the lights 32c and 34 c from becoming excessive and burning these lights out.

The circuit of FIG. 5 provides boosting at the lower engine speeds via a resonant circuit while providing regulation at higher engine speeds via a shunt regulating circuit. In FIG. 5, capacitor 40d is connected in a series resonance circuit with winding 20 via conductor 30; lights 32d and 34d are grounded at one end are connected on a parallel circuit which in turn is serially connected to capacitor 40d. The capacitor 40d is selected to provide resonance with winding 20 at low engine speeds to boost the voltage of the lights 32d and 34d at these speeds. A controlled conduction device SCR provides voltage regulation at higher engine speeds and has its anode connected to winding 22 via conductor 28 and has its cathode connected to ground. The gate of SCR is connected to its anode via a biasing resistor R. The resistor R is selected such that the SCR will be rendered conductive when the voltage generated by winding 22 reaches a preselected maximum. When SCR is conductive it will draw a sufficient short circuit current to effectively, magnetically shut down the generator 10. The result will be a reduction in the voltage generated by winding 22. In this way the output voltage to lights 32d and 34d can be controlled to prevent burnout from excessive voltage at higher engine speeds. The regulator circuit of SCR will also prevent one of the lights 32d or 34d from burning out in the event the other one burns out. Note that the SCR is connected to a side of the windings opposite that to which capacitor 40d is connected. With some installations this type of circuit can be significant, since here the SCR is not connected across the capacitor 40d and will not be subject to possible damage by the capacitor potential and/or discharge current.

FIGS. 6-8 represent still different circuit forms from FIGS. 1-5 and components similar to those of FIGS. 1-5 and serving similar functions have been given the same numerical designation with the addition of a letter postscript.

In FIG. 6 the generator 10e has a stator 16e which includes a pair of poles 18e upon which are wound, in series aiding relationship, a pair of windings 20e and 22e. The windings have a center tap 26e connected to the positive side of a battery Be at thence to ground. A pair of lights 32e and 34e are connected in parallel with one end connected to ground and the other end connected to center tap 26e. Thus the lights 32e and 34e can be energized both by the battery Be and by the windings 20e and 22e.

A pair of diodes D1e and D2e are connected to opposite ends of windings 20e and 22e, respectively, via conductors 28e and 30e, respectively. The diodes D1e and D2e provide for rectified charging current for battery Be from windings 20e and 22e. A resonant circuit 36e includes a capacitor 40e which is connected between conductors 28e and 30e and hence is connected across windings 20e and 22e. The capacitor 40e is selected to have a magnitude to be in resonance at low engine speeds i.e. around 2,000 r.p.m. Since capacitor 40e parallels windings 20e and 22e, at higher engine speeds, it will act as a shunt with the shunt current tending to shut the alternator 10e down and hence to regulate its output voltage. This regulation, however, will be somewhat crude and can be improved by the addition of a shunt regulating circuit. Thus a controlled conduction device SCRe has its anode connected to the winding 22e via conductor 28e and has its cathode connected to ground. The gate of SCRe is connected to the positive side of battery Be via a zener diode Z. The zener diode Z responds to the voltage across battery Be and when that voltage exceeds a preselected magnitude the zener Z will conduct turning SCRe on providing a low impedance shunt path for the winding 22e to ground. With winding 22e thus shunted to ground a relatively high back mmf will be generated by the resultant current which back mmf will result in the voltage generated by both windings 20e and 22e being substantially reduced. This system then will regulate the magnitude of voltages regardless of engine speed and will protect the lights 32e and 34e from burn out even if battery Be is removed and/or if one of the lights 32e or 34e should burn out.

In the system of FIG. 7, the windings 20f and 22f of generator 10f are connected in series aiding relationship via conductor 24f. A resonant circuit 36f is connected across windings 20f and 22f via conductors 28f and 30f. The resonant circuit 36f includes a capacitor 40f which is in series with the primary Pf of a transformer Tf. A secondary Sf of transformer Tf is magnetically coupled to primary Pf and has lights 32f and 34f connected in parallel thereacross. The capacitor 40f is selected relative to the other parameters of the circuit to be in resonance at low engine speeds, i.e. around 2,000 r.p.m., to thereby boost the voltage to lights 32f and 34f at low engine speeds. In the circuit of FIG. 7 a battery Bf is connected to a load L, i.e. ignition, starting circuit, etc., and is charged by the voltage from windings 20f and 22f via a conventional full wave bridge BR comprised of a plurality of diodes D. The input circuit of bridge BR is connected across windings 20f and 22f via leads 44 and 46 connected to leads 28f and 30f. The output of bridge BR has one side connected to ground and the other side connected to load L and battery Br via conductor 48. The load L and battery Bf each have one side connected to ground. To provide for regulation of the charge voltage for battery Bf, a controlled conduction device SCRf has its anode connected to winding 20f via conductor 30f and has its cathode connected to ground. The gate electrode of SCRF is connected across the battery Bf via a zener Zf. The zener Zf is selected to break down at a preselected potential indicative of an adequate potential on battery Bf. When this potential is attained the SCRf will be rendered conductive thereby providing a low impedance path for windings 20f and 22f whereby the generator 10f will be effectively shut down. Note that in this way the lights 32f and 34f will also be protected from excessive voltage at high engine speeds.

In the circuit of FIG. 7 the battery Bf provides a reliable and stable voltage source for obtaining the trigger signal for the SCRf in the regulating circuit. In FIG. 8 a battery is not included in the system and a capacitor is used to provide the trigger signal for the regulating circuit. In FIG. 8, windings 20g and 22g of generator 10g are connected in series aiding relationship via conductor 24g. A conventional full wave bridge BRg includes a plurality of diodes Dg. The input circuit of bridge BRg is connected across windings 20g and 22g via conductors 28g and 30g. The output of bridge BRg has one side connected to ground and the other side connected to lights 32g and 34g which are connected in parallel with one side grounded. A capacitor C is connected across the output of bridge BRg and is also connected to the trigger circuit of a regulating circuit. The regulating circuit includes a controlled conduction device SCR$g$ which has its anode connected to winding 20$g$ via conductor 30$g$ and has its cathode connected to ground. The gate electrode of SCR$g$ is connected to capacitor C via a zener Z $g$. The zener Z $g$ is selected to break down at a preselected potential at which adequate voltage is provided for the lights 32$g$, 34$g$ while excessive voltage is prevented. The discharge time constant of the circuit of capacitor C is selected relative to its input and output resistance circuits (including resistance of the lights) to be of a long enough duration relative to its charge time and relative to the frequency of the generated voltage whereby a stable trigger voltage to zern Z $g$ is provided resulting in good regulation of the voltage to lights 32$g$, 34$g$; at the same time the capacitor C because of its charge and discharge characteristics will enhance the voltage to the lights 32$g$, 34$g$ at low engines speeds to provide for improved illumination at these low engine speeds.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a lighting circuit for a vehicle having a generator, having generating windings for providing an output voltage, driven by an engine with the speed of the engine varying the speed of the vehicle and with the speed of the generator and hence output voltage varying with the speed of the engine, a circuit comprising:

conductor means electrically connecting light of the vehicle to the generating windings of the generator with the generator windings normally providing a low voltage to the lights over a low engine speed range whereby the illumination from the lights is not at a desirable level;

resonant circuit means externally connected to the generating windings of the generator for providing a resonant voltage condition with the generating windings for boosting the voltage to the lights over said preselected low engine speed range whereby adequate illumination will be obtained over substantially the entire speed range of the engine including said preselected low engine speed, said resonant circuit means comprising a capacitor connected directly across said windings having a magnitude selected relative to the inductance of the remainder of the circuit to provide resonance at an engine speed within said preselected low engine speed range; and regulating circuit means connected to the windings and including a controlled conduction device responsive to a preselected control potential connected directly across said windings for providing a low impedance across said windings for controlling the output voltage of the windings to prevent excessive voltage.

2. The circuit of claim 1 with said conductor means connecting said controlled conduction device to one side of the windings and connecting said capacitor to another side.

3. The circuit of claim 1 with the windings being center tapped to ground, said conductor cmeans connecting said controlled conduction device to one side of the windings in a grounded circuit and connecting said capacitor in series with the lights and to the other side of the windings in a grounded circuit.

4. The circuit of claim 1 with the windings being center tapped and further comprising a battery, and a pair of diodes, said conductor means connecting said capacitor across the windings in an ungrounded circuit, said conductor means connecting the lights in parallel with the battery and connecting that parallel circuit to the center tap and to ground, said conductor means connecting each diode to an opposite side of the windings in grounded circuits, said conductor means connecting said controlled conduction device to one side of the windings in a grounded circuit and connecting said controlled conduction device to the center tap with said preselected control potential being the potential at the center tap.

5. The circuit of claim 1 further comprising a battery and a full wave bridge having an input circuit and an output circuit, said resonant circuit means comprising a transformer having primary and secondary windings, said conductor means connecting said capacitor and said primary in a series circuit across the windings, said conductor means connecting the lights across said secondary, said conductor means connecting the winding to said input of said bridge and the battery to said output of said bridge, said conductor means connecting said controlled conduction device to one side of the windings and connecting said controlled conduction device to said output of said bridge with said control potential being the potential at the center tap.

6. In a lighting circuit including lights for a vehicle having a generator, having windings for providing an output voltage, driven by an engine with the speed of the engine varying the speed of the vehicle and with the speed of the generator and hence the output voltage varying with the speed of the engine, a circuit comprising:

a full wave bridge having an input and an output circuit, a capacitor and regulating means operable with the windings and including a controlled conduction device having a control terminal, said controlled conduction device being responsive to a preselected control potential at said control terminal for establishing a relatively low impedance path across said windings to control the output voltage of the windings to prevent excessive voltage; and conductor means electrically connecting the windings to said input of said bridge, said conductor means connecting said capacitor in a parallel circuit with the lights and connecting said parallel circuit to said output of said bridge, said conductor means connecting said controlled conduction device to one side of the windings and connecting said control terminal to said output of said bridge with said control potential being the potential at said output of said bridge, said capacitor having a magnitude relative to the impedance of the associated circuitry for boosting the potential to the lights at low engine speeds and for providing a relatively stable control potential to provide substantial regulation of the potential to the lights.

7. The circuit of claim 6 with said magnitude of said capacitor being selected relative to the resistance of the associated charging and discharging circuits with said capacitor having a charge time relatively short compared to the discharge time whereby the voltage to the lights will be increased at said low engine speeds.

8. In a circuit for a vehicle having a generator having windings for providing an output voltage and driven by an engine with the speed of the engine varying the speed of the vehicle and the speed of the generator and said output voltage, a circuit comprising: a full wave rectifier having an input and an output circuit, a capacitor and regulating means operable with the windings and including a controlled conduction device having a control terminal, said controlled conduction device being responsive to a preselected potential at said control terminal for turning on said controlled conduction device to establish a relatively low impedance path across said windings to control the output voltage of the windings to prevent excessive voltage, means electrically connecting the windings to the input of said rectifier, said last means connecting said capacitor to said output of said rectifier, said last means connecting said controlled conduction device to one side of the windings and connecting said control terminal to said capacitor with said control potential being derived from said capacitor, said capacitor having a magnitude relative to the impedance of the associated circuitry for providing a relatively stable control potential to provide substantial regulation of the potential to the lights.

9. A circuit according to claim 8 wherein said full wave rectifier is a full wave bridge.

10. A circuit according to claim 8 wherein said controlled conduction device is an SCR and said control terminal is the gate of said SCR.

11. A circuit according to claim 8 wherein said capacitor has a magnitude relative to the impedance of the associated circuitry for boosting the potential to the lights at low engine speeds.

12. In a lighting circuit for a vehicle having a generator having windings for providing an output voltage and driven by an engine with variations in the speed of the engine varying the speed of the generator and said output voltage, a circuit comprising: rectifier means having an input connected to said windings and an output, a controlled conduction device including a control terminal which is rendered conductive in response to a preselected potential at said control terminal for establishing a relatively low impedance path across said windings to control said output voltage from said windings to prevent excessive voltage, a capacitor connected to said output of said rectifier means for modifying at least a portion of said output voltage from said windings as rectified by said rectifier means in accordance with the value thereof, and means connecting said control terminal to said capacitor to provide said preselected potential to said control terminal in accordance with said modified voltage from said generator whereby said output voltage from said windings is controlled at least in part in accordance with the value of said capacitor.

13. A circuit according to claim 12 wherein said full wave rectifier is a full wave bridge.

14. A circuit according to claim 12 wherein said controlled conduction device is an SCR and said control terminal is the gate of said SCR.

15. A circuit according to claim 12 wherein said capacitor has a magnitude relative to the impedance of the associated circuitry for boosting the potential to the lights at low engine speeds.

* * * * *